United States Patent Office 2,768,897
Patented Oct. 30, 1956

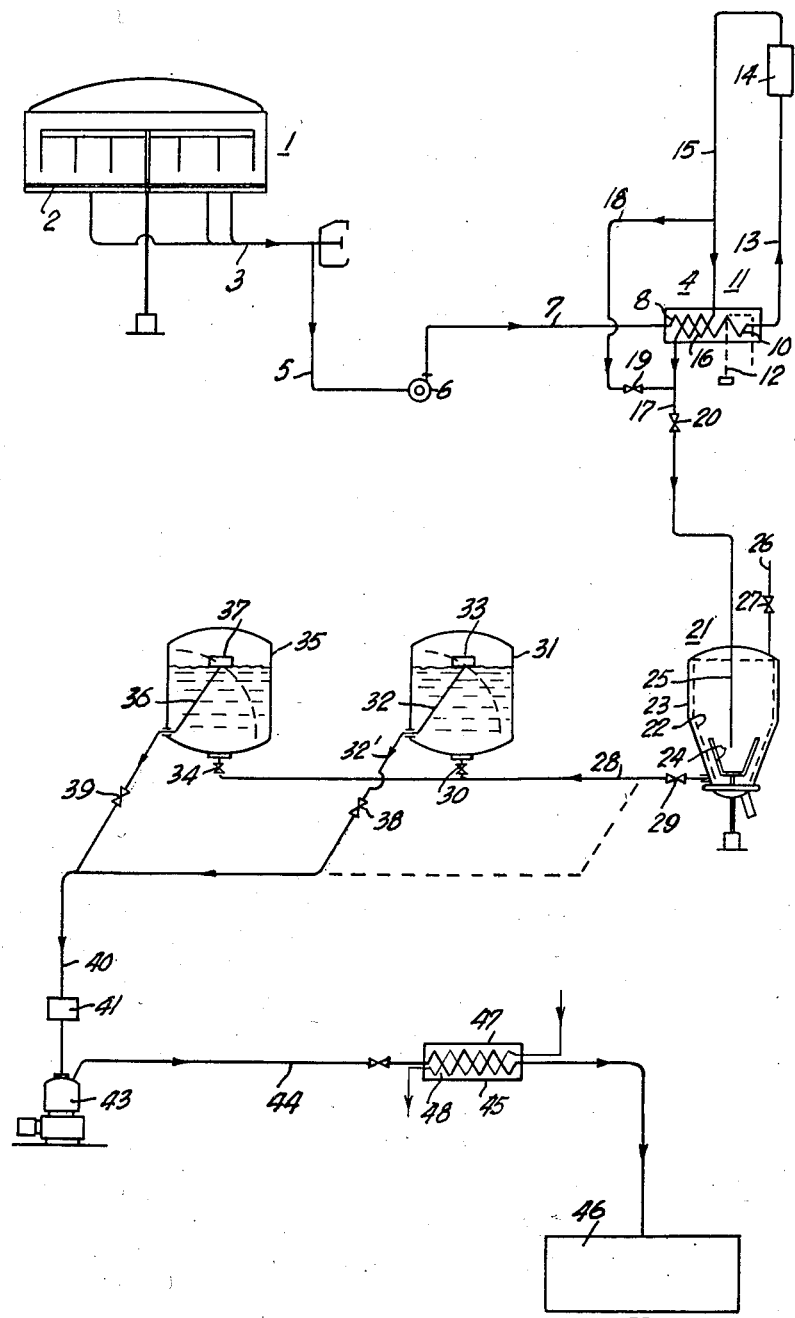

2,768,897

PROCESS AND APPARATUS FOR THE TREATMENT OF BREWERS' WORTS

Stanley William Thomas Paine, Addiscombe, England, assignor to The A. P. V. Company Limited, London, England, a British company Application November 25, 1952, Serial No. 322,373

Claims priority, application Great Britain November 29, 1951

11 Claims. (Cl. 99—52)

This invention relates to the treatment of brewers' wort. In such treatment as at present commonly carried out, an open boiling copper is used in which the wort is held at boiling temperature: in most cases the copper itself is heated but in the case of the process claimed in the specification of the applicant company Patent No. 2,555,938 the wort, although raised to a high temperature externally of the copper, are still fed to the copper at a temperature reduced from the high temperature.

One object of this invention is to enable a copper (or some equivalent vessel) to be dispensed with entirely, a further object is to provide an improved method of treating brewers' wort which will enable the production of the wort to be easily controlled.

These objects are achieved in accordance with this invention by continuously moving sweet wort from a mash tun and continuously passing it to a hop extraction stage and during such passage serially raising the temperature of the sweet wort, holding the sweet wort at that temperature, cooling the sweet wort, contacting the cooled wort in the extraction stage with hops to extract the latter, continuously removing the now hopped worts from the extraction stage and passing them to a discharge zone and subjecting the hopped worts serially to sedimentation and cooling during passage to the discharge zone.

The avoidance of the usual copper and the regulation, which is rendered possible by this invention with the separate stages of treatment, of the variables necessary to carry out the requisite treatment, enables continuous flow of wort to be achieved with consequent advantage in wort production and ease of control of the quality of the wort finally delivered at the collection stage where fermentation may be allowed to take place.

The invention is illustrated in the accompanying single figure of the accompanying drawing, this figure being a diagrammatic lay-out of an installation.

Referring to the drawing, the reference 1 indicates a mash tun of any conventional form: such a mash tun has, as is well known, a perforated base 2 to carry a charge of malt to which "liquor" is supplied, the resulting melted liquor passing through the perforated base 2 and being taken off as sweet wort by a pipe 3 to a collecting trough 3.

The sweet wort is drawn from the vessel 3 through a pipe 5 by a pump 6 which delivers the sweet wort through a pipe 7 to one side 8 of a heat recuperator 9 whence the sweet wort passes through one side 10 of an indirect heating device 11 the other side 12 of which is supplied with a heating medium such as steam.

From the output of the heating device 11 the sweet wort passes, at the temperature to which it has been raised by the heating device through a pipe 13 to a vessel 14 of such capacity that the sweet wort remains in the vessel at the temperature for a predetermined period following which the wort is conveyed by a pipe 15 to the other side 16 of the heat recuperator 9. By passing through the recuperator 9 the sweet wort is reduced in temperature by transference of some part of its heat to the sweet wort passing in through the pipe 7 to the recuperator so effecting economy in the use of heating medium. For the purpose of controlling the temperature at which the sweet wort passes (through a pipe 17) to the next stage of treatment, a pipe 18 is branched from the pipe 15 on the upstream side of the recuperator 9, this pipe 18 bypassing the recuperator 9 and being connected to the pipe 17 through a control valve 19: the control valve 19 can be operated to regulate the volume of the bypass flow and therefore the temperature of the wort passing to the pipe 17 by variation of the ratio of wort cooled by flow through the recuperator to high temperature wort which bypasses the recuperator and so is not cooled by heat transfer.

The total flow of sweet wort passes from the high temperature stage through the pipe 17 at a rate governed by a control valve 20. This pipe conveys the thus far treated sweet worts to a hop extraction vessel indicated generally at 21. This vessel is of the customary form and comprises an inner perforated basket 22 which holds a charge of hops, an outer casing 23 which forms a flow space about the basket and an agitator 24 which is driven to agitate the hops to promote extraction by the sweet wort which is fed by the pipe 21 to a feedpipe 25 extending into the basket. The hop extraction vessel is provided with a discharge pipe 26 for the vapour liberated from the wort, this pipe having a control valve 27 to regulate the rate of discharge of vapour and hence the degree of concentration of the hopped wort passing from the hop extraction vessel.

The wort, now hopped wort, is taken from the hop extraction vessel 21 by a pipe 28 having a flow control valve 29.

From the commencement of a continuous run of the liquor from sweet wort to hopped wort, the wort will have a certain strength which will however become lower as the treatment proceeds. The discharge of hopped wort in the first part of the run (this wort being termed strong wort) can be delivered through a control valve 30 to a sedimentation vessel 31 having a swivel discharge pipe 32, the upper intake end of which is maintained by a float 33 at the upper level of the wort in the vessel and hence clear of the sediment, the pipe 32 connecting with a flow pipe 32'.

The discharge of hopped wort in the second part of the treatment (this hopped wort being termed weak wort) will be delivered from the pipe 27 through a control valve 34 to a sedimentation vessel 35 having, like the vessel 31, a discharge pipe 36 which is moved by a float 37, this pipe 36 connecting with a flow pipe 36'.

In both sedimentation vessels 31, 35 fluocculation would occur and the worts would be discharged from the vessels through the two pipes 32, 36, having control valves 38, 39 respectively. Down stream of these valves the pipes 36, 37 are united so that by manipulation of the valves a blend of the strong and weak wort will be obtained, the resulting wort passing through a pipe 40 to a device 41 of any usual form to ensure a complete blending or admixture of the weak and strong wort.

The blended wort passes from the device 41 through a pipe 42 to a sludge separator 43, which may be of any usual form such as a centrifuge, whence the now clarified wort passes through a pipe 44 to a cooling device 45, which may be of any known type, and thence to a fermenting or collecting vessel 46. The cooling device 45, as shown, is of the heat exchange type, the wort being passed through one side 47 of the device and a cooling medium being conveyed through the other side 48.

It is not essential to provide a special flocculation vessel such as the vessel 31 or 36 nor is it essential that provision shall be made to collect strong and weak wort and then to blend them.

Thus, as is shown in the drawing, the vessels 31, 35, their associated parts and the blending valves 38, 39 can be dispensed with entirely, the pipe 27 through which the hopped wort passes from the hop extraction stage being taken direct to the sludge separator, it may be through the device 41 to ensure a uniform consistency to the sludge separator 43. In such a case the wort will, so to speak, average-out its strength in the collecting vessel 46 while flocculation will occur as the hopped wort flows from the hop extraction vessel 21 to the sludge separator where the flocculum is removed.

It will be clear that the invention enables wort to flow continuously from the mash tun 1 through to the fermenting or collecting vessel 46, the rate of flow being regulated as required to produce the required holding action in the various stages.

The precise operating conditions are of course capable of considerable variation, depending on the type of wort, mashing, and fermenting processes and so on, but as an example the following values can be referred to.

On leaving the mash tun 1—temperature, 148° F. to 175° F.
(Feed to the recuperator 9)

On leaving the heater 11—temperature, 260–300° F.; pressure, 20–50 p. s. i. g.
(Feed to the vessel 14)
   (Holding time in vessel, 14.5–30 seconds)

On leaving the recuperator 9—temperature, 212–228° F.; pressure, 0–5 p. s. i. g.
(Feed to the hop extraction vessel 21)

In hop extraction vessel 21—temperature, 212–218° F.; pressure, 0–2 p. s. i. g.
   (Holding time in vessel, 10–30 minutes)

In sedimentation vessel 31 or 35—temperature, 212–185° F.; pressure, atmospheric.
   (Holding time in vessel, 30 minutes to 2 hours)

In centrifuge 43—temperature, 185°–190° F.

Wort cooler 47: wort temperatures, inlet 185–190° F.; outlet 45–60° F.

The vessel 14, the hop extraction vessel 21 and the vessels 31, 35 would be of a capacity which, in relation to the feed of worts, gives the requisite holding time for the functions of those vessels, i. e. of the vessel 14 to hold the sweet worts at the high temperature, of the hop extraction vessel 21 to hop the worts, and of the vessels 31, 35 to hold the hopped worts for a time sufficient to insure flocculation and sedimentation of the wort proteins. The separator may be not only of the centrifuge type but of the diatomaceous earth or edge filter type as may be found most convenient.

As shown, the vessels of the various successive stages of the progressive action on the wort are shown as single vessels; however in some case it may be desirable at each stage to provide two or more vessels having the same function but arranged in series or parallel connection in the wort flow, such multiplication of the vessels serving to adapt the installation to the requirements of various wort flows.

It will be evident that as the various stages of treatment, i. e. the high temperature treatment of the sweet worts, the hopping of the sweet worts after it has been cooled in the recuperator 9, and the sedimentation, treatment are effected in separate stages, each stage can be regulated separately to give the optimum conditions for the particular treatment in that stage: the arrangement of this invention therefore affords a considerable degree of flexibility in control by enabling the time of treatment and the temperature of treatment at each stage to be selected.

What I claim is:
1. An apparatus for the continuous production of hopped wort comprising a source of supply of sweet wort, a heating device, a holding vessel, a first cooling device, a hop extraction vessel, a sedimentation vessel having a sediment removing device, a second cooling device, a collecting vessel, and means including connections to continuously convey sweet wort from the source of supply through the heating device, the holding vessel, and the firt cooling device to the hop extraction vessel, and from the hop extraction vessel to the sedimentation vessel and the second cooling device to the collection vessel, the holding vessel, the hop extraction vessel and the sedimentation vessel being of a capacity to hold the wort for the required period while it is in continuous movement through the installation.

2. An installation as claimed in claim 1 and wherein the first cooling device comprises a heat exchange recuperator, by which sweet wort drawn from the said source of supply is preheated by heat extracted from wort passing from the holding vessel.

3. An apparatus as claimed in claim 1 and wherein the first cooling device comprises a heat-exchange recuperator to preheat sweet wort passing from the source of supply to the heating device, the installation including a connection from the vessel to the hop-extraction vessel, arranged in shunt of the recuperator, the said connection being valve controlled to permit regulation of the temperature of the wort passing to the hop extraction vessel.

4. An apparatus as claimed in claim 1 and comprising two sedimentation vessels, connections enabling strong and weak hopped wort to be passed respectively to the vessels from the hop-extraction vessel and control-valves enabling the strong and weak wort to be blended.

5. An apparatus for the continuous production of hopped wort comprising a source of supply of sweet wort, a heating device, a holding vessel, a first cooling device, a hop extraction vessel, a sedimentation vessel having a sediment removing device, a second cooling device, a fermentation vessel, and means including connections to continuously convey sweet wort through the heating device, the holding vessel and the first cooling device to the hop extraction vessel, and from the hop extraction vessel to the sedimentation vessel and the second cooling device to the fermentation vessel, the holding vessel, the hop extraction vessel and the sedimentation vessel being of a capacity to hold the wort for the required period while it is in continuous movement through the installation.

6. A continuous process of producing hopped brewers' worts comprising continuously removing sweet worts from a mash tun and continuously passing it to a hop extraction stage and during such passage, serially raising the temperature of the sweet worts, holding the sweet worts at that temperature, cooling the sweet worts, contacting the cooled worts in the extraction stage with hops to extract the latter, continuously removing the hopped worts from the extraction stage and passing them to a discharge zone, and subjecting the hopped worts serially to sedimentation and cooling during passage to the discharge zone.

7. A continuous process of producing hopped brewers' worts comprising continuously removing sweet worts from a mash tun and continuously passing it to a hop extraction stage and during such passage, serially raising the temperature of the sweet worts to about 260°–300° F., holding the sweet worts at that temperature, cooling the sweet worts to about 212°–218° F., contacting the cooled worts in the extraction stage with hops to extract the latter continuously removing the hopped worts from the extraction stage and passing them to a discharge zone, and subjecting the hopped worts serially to sedimentation and cooling during passage to the discharge zone.

8. A process according to claim 6 in which the rate of evaporation during the hop extraction is controlled.

9. A continuous process of producing hopped brewers' worts comprising continuously removing sweet worts from a mash tun and continuously passing it to a hop extraction stage and during such passage, serially raising the temperature of the sweet worts, holding the sweet worts at that temperature, cooling the sweet worts, contacting the cooled worts in the extraction stage with hops to extract the latter, continuously removing the hopped worts from the extraction stage, separating strong worts from relatively weak worts and passing them to a discharge zone, and subjecting the hopped worts serially to sedimentation and cooling during passage to the discharge zone.

10. A continuous process of producing hopped brewers' worts comprising continuously removing sweet worts from a mash tun and continuously passing it to a hop extraction stage and during such passage, serially raising the temperature of the sweet worts to about 260°–300° F., holding the sweet worts at that temperature, passing the worts in heat exchange recuperation with incoming sweet worts to reduce the temperature of the outgoing sweet worts to a value of about 212°–218° F., contacting the cooled worts in the extraction stage with hops to extract the latter, continuously removing the hopped worts from the extraction stage and passing them to a discharge zone, and subjecting the hopped worts serially to sedimentation and cooling during passage to the discharge zone.

11. A process according to claim 6 in which the high temperature treatment of the worts, the hop extraction after the worts have been cooled and the sedimentation of the hopped worts are carried out in separate zones whereby the temperature and duration of treatment in the different zones can be independently regulated to obtain the required operating conditions.

References Cited in the file of this patent

UNITED STATES PATENTS

| | | |
|---|---|---|
| 2,471,474 | Alba et al. | May 31, 1949 |
| 2,553,938 | Seligman et al. | June 5, 1951 |